W. F. RAY.
RELIEF VALVE FOR TIRES.
APPLICATION FILED JAN. 29, 1917.
1,250,503.
Patented Dec. 18, 1917.
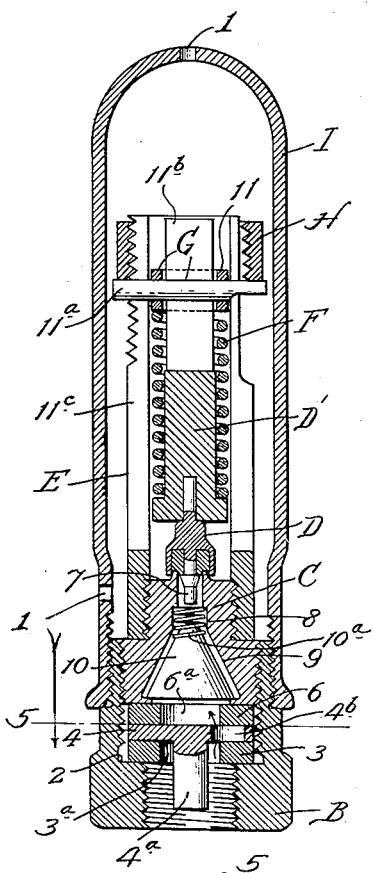
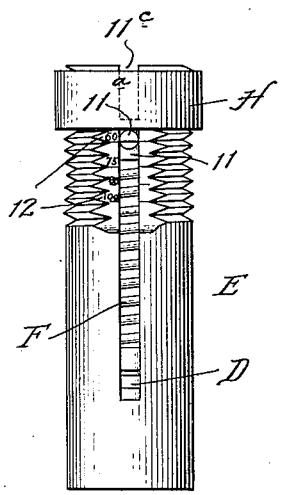
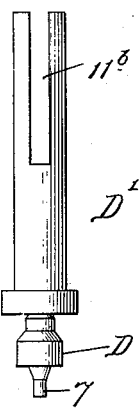
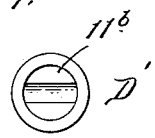
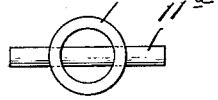
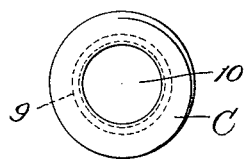
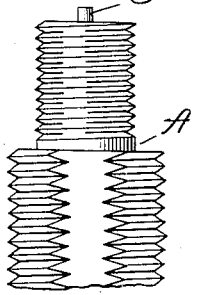
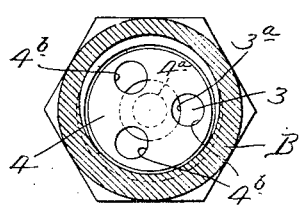
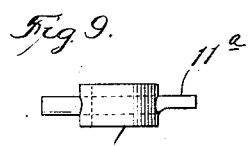
Inventor:
William F. Ray,

UNITED STATES PATENT OFFICE.

WILLIAM F. RAY, OF CHICAGO, ILLINOIS.

RELIEF-VALVE FOR TIRES.

1,250,503. Specification of Letters Patent. Patented Dec. 18, 1917.

Application filed January 29, 1917. Serial No. 145,224.

*To all whom it may concern:*

Be it known that I, WILLIAM F. RAY, a citizen of the United States, residing at Chicago, in the county of Cook and State of Illinois, have invented a new and useful Improvement in Relief-Valves for Tires, of which the following is a specification.

This invention relates particularly to relief valves adapted to automatically maintain a given pressure in pneumatic tires; and the primary object is to provide a simple, cheap, and effective relief valve for the purpose indicated.

The invention is illustrated, in its preferred embodiment, in the accompanying drawing, in which—

Figure 1 represents a vertical sectional view of my improved relief valve; Fig. 2, a broken elevational view of the stem of the tube of a pneumatic tire to which the relief valve may be applied; Fig. 3, an elevational view of a spring-housing and guide employed; Fig. 4, a bottom view of a plug employed; Fig. 5, a sectional view taken as indicated at line 5 of Fig. 1; Fig. 6, an elevational view of the relief valve proper and its stem; Fig. 7, a plan view of the same; Fig. 8, a plan view of a spring-follower employed; and Fig. 9, an elevational view of the same.

In the construction illustrated, A represents a nipple or stem with which the tube of a pneumatic tire is ordinarily equipped; B, a nut adapted to be applied to the stem A and which forms the base of the improved relief valve; C, a plug having a threaded connection with the interior of the upper portion of the base-member B, the plug C having its upper end formed to provide a valve-seat for the relief valve; D, the relief valve, which is fitted with an enlarged stem D¹; E, a slotted tubular housing having its lower end internally threaded and screwed onto the reduced upper end of the plug C; F, a spring which closely encircles the stem D¹ and is confined within the slotted tubular member E; G, a spring-follower slidably connected with the slotted members D¹ and E; H, a nut applied to the upper end of the tubular member E and serving to regulate the tension of the spring F through the medium of the follower G; and I, a dust-cap which houses the operative parts and has threaded connection with the upper end of the member B, said dust-cap being provided with vent holes 1.

The base member, or nut B is provided with an internal shoulder 2 upon which bears a washer 3 having an enlarged central perforation 3ª. Upon the washer 3 bears a disk 4 which is equipped with a depending stud 4ª, which is adapted to engage the valve pin 5 of the tire. The disk 4 is provided with a series of small perforations 4ᵇ which communicate with the central perforation 3ª of the washer 3. Above the disk 4 is a washer 6 having an enlarged central perforation 6ª which communicates with the perforations 4ᵇ.

The washers 3 and 6 and the interposed disk 4 are clamped between the plug C and the internal shoulder 2. The plug C has a relatively large lower end portion which is externally threaded and which screws into the internally-threaded bore of the member B. The upper end of the plug C is reduced and externally threaded; and the lower end of the slotted tubular member E is internally threaded and screwed upon the reduced upper end of the member C. At the upper end of the plug C is formed a small conical valve-seat upon which the relief valve D bears.

The relief valve D is fitted with a central depending small stem 7 which depends freely into a central perforation 8 with which the plug C is provided. The central perforation 8 communicates at its lower end with a conical valve-chamber 9 in which is confined a floating conical valve 10. The check-valve 10 is adapted to close the passage 8 in the event of a sudden increase of pressure in the tire, such as might come from a violent deformation of the tire. Normally, however, the valve 10 does not operate to close the passage 8, but rather allows the pressure from the tire to be communicated to the valve D. Thus, any gradual increase in pressure in the tire, such as would arise from the gradual expansion of the air as the tire becomes heated, would operate to open the relief valve D and permit the gradual escape of the air through the slotted tube E and perforate dust-cap I.

The check valve 10 may be of any suitable material. It is designed to check the sudden communication of an excess of pressure to the relief valve from the interior of the tire. It may, however, be dispensed with, in which case the spring pressure will be so adjusted as to hold the valve D seated against a predetermined pressure, taking into consideration any rise in pressure which may come from sudden deformation of the tire. A spring 10ª is employed to overcome any tendency of the valve 10 to stick in the conical seat.

The spring-follower G comprises a ring 11 which is confined freely between the valve-stem D¹ and the tubular housing E, and a transverse pin 11ª which extends through said ring and through vertical slots 11ᵇ and 11ᶜ, with which the valve-stem D¹ and the tubular housing E are respectively provided. The upper portion of the slotted tubular member E is externally threaded to receive thereon the internally-threaded nut H which serves to adjust the spring-follower.

The threaded portion of the slotted tubular member E has one side thereof planed and provided with a series of graduations 12. These graduations coöperate with the pin 11ª of the spring-follower 11 in determining the point at which the follower should be set for a given pressure. For illustration, if the pin 11 be set opposite the graduation 60, the relief valve D will open under a pressure of 60 pounds or greater; if, however, the pin 11ª be set opposite the graduation 100, it will require a pressure of 100 pounds to open the relief valve.

It will be understood from the foregoing that the stud 4ª of the relief-valve device serves to open the valve controlled by the pin 5 in the stem A, when the relief-valve device is applied to said stem. Thus, the pressure from the interior of the tire is permitted to pass to the point where the relief valve proper D controls the outlet from the central passage 8 of the plug C. The adjustment of the spring F determines the pressure which will be required to open the relief valve D. The spring tension is adjusted through the medium of the nut H, as explained; and the desired pressure is indicated by the pointer or stud 11ª, acting in conjunction with the graduations 12 on the threaded portion of the slotted tubular spring housing E. In case of any sudden increase in the pressure, such as may arise from a violent deformation of the tire in striking an obstruction, the check valve 10 will operate to prevent the abnormal pressure from reaching the relief valve D. As explained, however, the check valve 10 may be dispensed with, if desired, although its use is advisable.

The foregoing detailed description has been given for clearness of understanding only, and no unnecessary limitation should be understood therefrom, but the appended claims should be construed as broadly as permissible, in view of the prior art.

What I regard as new, and desire to secure by Letters Patent, is:—

1. In a relief-valve device for tires, the combination of a base part adapted to be screwed onto the stem of the tire and equipped with means for depressing the stem of the tire valve, a relief-valve-seat carried by said base member, a relief valve bearing on said seat and equipped with an upwardly-extending stem, a spring-housing carried by said base member, a spring and adjusting means connected with said housing and controlling said relief valve, and a normally unseated check valve interposed between said relief valve and the base portion of the relief-valve device.

2. In a relief-valve device, the combination of a base member adapted to be applied to the stem of a pneumatic tire and equipped with means for holding open the valve in said stem, a relief-valve-seat carried by said base member, a relief valve guarding the passage therethrough, a normally unseated check valve disposed below the relief valve, a spring bearing on said relief valve, and spring supporting and adjusting means supported from said base member.

3. In a relief-valve device, the combination of a casing provided with an air passage and having a relief-valve-seat and a check valve chamber, a downwardly-seating relief-valve, a spring and adjusting means therefor controlling said relief valve, and an upwardly-seating, spring-released check valve in said chamber.

4. In a relief-valve device, the combination of a spring-housing, a plug at the base thereof provided with an air passage and equipped with a relief-valve-seat and provided with a check-valve chamber, a relief valve bearing on said seat, a spring and adjusting means connected with said housing and controlling said relief valve, a normally unseated check-valve in said check-valve chamber, and means disposed below said check valve and adapted to open the tire valve when the device is applied to the stem of a tire.

5. A relief-valve device, comprising a tubular base member having an enlarged threaded bore at its upper end and a reduced threaded bore at its lower end, a washer and a stud-equipped perforate disk supported by the internal shoulder of said base member, a threaded plug screwed into the upper portion of said base member and clampingly holding said disk in position, said plug having a central air passage with an enlargement at the lower portion thereof affording a valve chamber, the upper portion of said plug affording a relief-valve-seat, an upwardly seating check-valve in said valve-chamber, a relief-valve mounted on said seat and equipped with an upwardly-extending stem, a spring-housing rising from and having threaded connection with said plug, a spring confined between said stem and said spring-housing and controlling said relief valve, and spring-adjusting means connected with the upper end of said spring-housing.

WILLIAM F. RAY.